(12) United States Patent
Miedema et al.

(10) Patent No.: US 12,244,458 B2
(45) Date of Patent: Mar. 4, 2025

(54) LIMITING THE SCOPE OF A DECLARATIVE CONFIGURATION EDITING OPERATION

(71) Applicant: Ciena Corporation, Hanover, MD (US)

(72) Inventors: David Miedema, Ottawa (CA); David McDonald, Atlanta, GA (US); Rodd Lamarche, Ottawa (CA)

(73) Assignee: Ciena Corporation, Hanover, MD (US)

( * ) Notice: Subject to any disclaimer, the term of this patent is extended or adjusted under 35 U.S.C. 154(b) by 17 days.

(21) Appl. No.: 17/196,177

(22) Filed: Mar. 9, 2021

(65) Prior Publication Data

US 2022/0294692 A1    Sep. 15, 2022

(51) Int. Cl.
*H04L 12/24* (2006.01)
*G06F 9/44* (2018.01)
*H04L 29/06* (2006.01)
*H04L 29/08* (2006.01)
*H04L 41/0816* (2022.01)
*H04L 41/0853* (2022.01)
*H04L 41/0893* (2022.01)

(52) U.S. Cl.
CPC ...... *H04L 41/0816* (2013.01); *H04L 41/0853* (2013.01); *H04L 41/0893* (2013.01)

(58) Field of Classification Search
CPC ............. H04L 41/0816; H04L 41/0893; H04L 41/0853

See application file for complete search history.

(56) References Cited

U.S. PATENT DOCUMENTS

| | | | |
|---|---|---|---|
| 5,905,724 A * | 5/1999 | Carson | H04M 7/126 370/385 |
| 6,243,747 B1 * | 6/2001 | Lewis | H04L 41/0894 709/224 |
| 6,256,773 B1 * | 7/2001 | Bowman-Amuah | G06F 8/71 707/999.203 |
| 6,704,030 B1 * | 3/2004 | McDonald | H04L 41/22 715/780 |
| 7,995,569 B2 | 8/2011 | Ashwood-Smith et al. | |
| 8,364,036 B2 | 1/2013 | Boertjes et al. | |
| 8,966,018 B2 * | 2/2015 | Bugwadia | G06F 9/4411 709/223 |

(Continued)

*Primary Examiner* — Thomas J Dailey
*Assistant Examiner* — Golam Mahmud
(74) *Attorney, Agent, or Firm* — Baratta Law PLLC; Lawrence A. Baratta, Jr.

(57) ABSTRACT

Systems and methods for editing configuration data may include, according to one implementation, receiving a request to edit existing configuration data associated with a Network Element (NE) operating in a network. The existing configuration data includes a plurality of data access groups, each data access group including one or more attributes that characterize functional aspects of the NE. The systems/methods also include defining a selected set of data access groups from the plurality of data access groups and receiving new configuration data for editing a portion of the existing configuration data, which includes a subset of data access groups from the selected set of data access groups. The systems/methods then replace the subset of data access groups with the new configuration data while preventing change to the existing configuration data associated with one or more data access groups excluded from the selected set of data access groups.

17 Claims, 4 Drawing Sheets

(56) References Cited

U.S. PATENT DOCUMENTS

| | | |
|---|---|---|
| 9,060,215 B2 | 6/2015 | Miedema |
| 9,258,190 B2 | 2/2016 | Swinkels et al. |
| 9,485,013 B2 | 11/2016 | Al Sayeed et al. |
| 9,686,176 B2 | 6/2017 | Traxler et al. |
| 9,819,565 B2 | 11/2017 | Djukic et al. |
| 10,015,049 B2* | 7/2018 | Sabev ................ H04L 41/0846 |
| 10,148,506 B1* | 12/2018 | Anburose ........... H04L 41/5006 |
| 10,178,021 B1* | 1/2019 | Devillard ................ H04L 45/04 |
| 10,440,128 B2 | 10/2019 | Miedema |
| 10,455,300 B2 | 10/2019 | Swinkels et al. |
| 10,511,517 B2* | 12/2019 | Subhedar ................ H04L 45/02 |
| 10,516,761 B1* | 12/2019 | A ............................ H04L 41/12 |
| 10,680,739 B2 | 6/2020 | Swinkels et al. |
| 10,715,888 B2 | 7/2020 | Swinkels et al. |
| 10,735,837 B1 | 8/2020 | Al Sayeed et al. |
| 10,797,818 B1 | 10/2020 | Croskery et al. |
| 10,887,190 B2* | 1/2021 | Clark ...................... H04L 67/12 |
| 10,891,176 B1 | 1/2021 | Miedema |
| 10,924,347 B1* | 2/2021 | Narsian ................. H04L 47/12 |
| 11,290,327 B1* | 3/2022 | Ramanathan ....... H04L 43/0817 |
| 2003/0051008 A1* | 3/2003 | Gorthy ............... H04L 41/0226 709/220 |
| 2003/0088652 A1* | 5/2003 | Takahashi ........... H04L 41/0869 709/221 |
| 2005/0234931 A1* | 10/2005 | Yip ..................... H04L 41/5054 |
| 2007/0268514 A1* | 11/2007 | Zeldin ................ H04L 41/0213 358/1.15 |
| 2008/0162671 A1* | 7/2008 | Mann .................. H04L 41/0879 709/224 |
| 2008/0181131 A1* | 7/2008 | Raghavan .............. H04L 67/34 370/254 |
| 2009/0164448 A1* | 6/2009 | Curtis ................... G06F 16/438 707/999.005 |
| 2010/0180016 A1* | 7/2010 | Bugwadia ............. G06F 9/4411 713/168 |
| 2014/0173067 A1* | 6/2014 | Newton .............. H04L 41/0823 709/221 |
| 2014/0222771 A1* | 8/2014 | Sekiguchi ........... H04L 41/0893 707/694 |
| 2014/0233946 A1* | 8/2014 | Gerstel ................ H04L 45/125 398/45 |
| 2015/0089031 A1* | 3/2015 | Kalali ..................... H04L 67/34 709/220 |
| 2017/0207968 A1* | 7/2017 | Eicken .................... H04L 67/01 |
| 2018/0026834 A1* | 1/2018 | Dec ......................... H04L 41/40 709/221 |
| 2018/0026855 A1* | 1/2018 | Ji ......................... H04L 41/0893 709/223 |
| 2018/0199239 A1* | 7/2018 | Sabater Maroto .. H04L 41/0895 |
| 2018/0351827 A1* | 12/2018 | Karam .................. H04L 41/046 |
| 2019/0045343 A1* | 2/2019 | Palanisamy ............ H04W 4/50 |
| 2019/0052526 A1* | 2/2019 | Zhang ................ H04L 41/0893 |
| 2019/0245732 A1* | 8/2019 | Luo ..................... H04L 41/0859 |
| 2019/0327140 A1* | 10/2019 | Lipstone ............... H04L 67/562 |
| 2019/0349262 A1 | 11/2019 | Miedema et al. |
| 2020/0036589 A1* | 1/2020 | A ......................... H04L 41/0816 |
| 2020/0067790 A1* | 2/2020 | Hsiao .................... H04L 43/022 |
| 2020/0106658 A1* | 4/2020 | A ......................... H04L 41/0853 |
| 2020/0252307 A1 | 8/2020 | Miedema |
| 2020/0259712 A1* | 8/2020 | Jonnalagadda ..... H04L 41/0843 |
| 2020/0389497 A1* | 12/2020 | Cam-Winget .......... H04L 41/22 |
| 2021/0042172 A1 | 2/2021 | Miedema et al. |
| 2021/0042173 A1 | 2/2021 | Prakash et al. |

* cited by examiner

LIMITING THE SCOPE OF A DECLARATIVE CONFIGURATION EDITING OPERATION

TECHNICAL FIELD

The present disclosure generally relates to networking systems and methods. More particularly, the present disclosure relates to editing configuration data for network elements operating in a network and limiting the scope to which the configuration data is to be edited.

BACKGROUND

Generally, a communication network includes a number of physical network elements that are adapted to communicate with each other to enable various network services. Normally, each physical network element includes configuration data that has attributes or settings defining various aspects of the respective network element for allowing it to function properly within the network. Configuration data for a respective network element may be stored locally or in a remote database. Occasionally, a network may undergo changes that may in turn require new configuration data for one or more of the network elements. Also, updates to the network elements themselves may also warrant new configuration data.

Managing configuration changes is a job that is normally handled by a network configuration management system, which may also be adapted to monitor performance, detect faults, perform administrative functions, provide network security, among other functions. Without sufficient management of configuration data, faulty configuration changes can lead to network elements becoming inoperable within the network or operating at less than optimal conditions. Hence, it is important to manage configuration data properly to reduce device (or network) downtime, improve productivity, ensure compliance, etc.

Network configuration management involves monitoring device configuration data and changes that are made to this data. In a production network, many problems may arise as a result of issues with configuration data. One common issue, for example, involves making changes to existing configuration data in a situation where the configuration data is not completely known to a network operator.

In NETCONF, a "declarative" configuration change can either be applied directly to the running configuration datastore via a <edit-config> replace operation or staged to a "candidate" configuration datastore and copied to running via a <copy-config> operation. A "declarative" change (as opposed to an "imperative" change) can be understood to be a declaration by a network operator (or other user) of a desired state of a system, whereby network configuration management systems may be adapted to compare the desired state with a present state to automatically update the system to match the declared state.

In gRPC/gNMI, "replace" operations are possible at any level of a data tree associated with the configuration data but are typically done at the root. Hence, the provided configuration replaces the entire configuration data for the target device. This is normally done only when the network operator has full knowledge of the entire configuration.

When trying to replace elements in a YANG data tree, there are limitations on how a list can be replaced. A complete list is not an addressable element in YANG-based management interfaces. Thus, if an entire configuration list is to be replaced, the network operator (or other user) can perform one of two different procedures. In a first procedure, the network operator must know or retrieve the current elements in the configuration list and explicitly delete the elements that are no longer intended, providing replacements for each element that is intended to be added or updated. However, this is a complex process involving steps to lock, copy, analyze, update configuration, and then commit. This may require a "get-before-set" scenario to understand which elements to delete. As such, this technique is more "imperative" than "declarative."

In a second procedure, the network operator must target the replace operation to the parent node of the list with the new entire list such that omitted elements will be implicitly deleted from the list. However, this requires a lock, query, and inclusion of all other elements at the parent node so as to avoid replacing the parent with a subset of data or out-of-date data, which may have unintended side effects.

In a device that has multiple ways of managing configuration data (e.g., a hybrid data model), the same underlying hardware may be implemented by accessing different elements of the configuration. There may usually be a preferred model for a user (e.g., network operator, network manager, client, etc.), even though more than one data model may be visible to a network operator, since a server normally does not restrict access by users to only one method of control. In this model, a replace of the root will involve specifying all elements in the model, even the ones outside the known scope of interest of the user. The YANG-based management protocols only include full-knowledge of the entire configuration. A different and related issue than what is described has to do with the increased risk of unintended consequences, and/or the additional complexity for the user making configuration changes, that results from the device's implementation to support the models. Inevitably the device will have a single internal model meaning that one or more of the customer models is "mapped" internally. Mappings can be complex between dissimilar models.

To get around some of these issues, conventional system may have to resort to slow, fragile, and intensive operations that must be performed to make sure that a widely-scoped replace operation does not have unintended consequences when it is applied. However, a user having insight into the unintended negative consequences of the implicit deletes, which normally result from a replace operation, may be inclined to not use replace at all. Instead, the user may resort to doing targeted merge, set, and delete operations, which adds complexity to these operations. Therefore, in the realm of network configuration management, there is a need to overcome the above-mentioned issues in the conventional systems to simplify the process of changing configuration data for one or more network elements in a network.

BRIEF SUMMARY

The present disclosure is directed to systems, methods, Network Management Systems (NMSs), Network Configuration Management (NCM) systems, and non-transitory computer-readable media for enabling the edit or replacement of portions of configuration data associated with a Network Element (NE) in a communications network. In particular, the present disclosure allows a targeted replacement function that only replaces certain data access groups or attributes of the configuration that a user wishes to modify while leaving those data access groups or attributes that were omitted from identified portions as-is, without deletion or replacement. The present disclosure introduces a benefit for network equipment vendors also in that it simplifies the implementation of mappings and providing the correct behavior of specific management interface protocols.

A network management system, according to one implementation, includes a processing device, and a memory device adapted to store a computer program having instructions. The instructions, when executed, enables the processing device to receive a request to edit existing configuration data associated with a Network Element (NE) operating in a network, where the existing configuration data includes a plurality of data access groups, and where each data access group includes one or more attributes that characterize functional aspects of the NE. Furthermore, the instructions also enable the processing device to define a selected set of data access groups from the plurality of data access groups and also receive new configuration data for editing a portion of the existing configuration data. The portion of the existing configuration data to be edited include a subset of data access groups from the selected set of data access groups. Finally, the instructions enable the processing device to replace the subset of data access groups with the new configuration data while preventing change to the existing configuration data associated with one or more data access groups excluded from the selected set of data access groups.

The network management system is further defined whereby replacing the subset of data access groups may include pushing the new configuration data to a datastore associated with the NE. The request may be a declarative operation allowing a user to declare a desired state of the network, such that the instructions may further enable the processing device to compare the desired state of the network with a current state of the network defined by at least the existing configuration data associated with the NE. As a result of comparing the desired state with the current state, the processing device may be adapted to further define the selected set of data access groups.

Also, the network management system may include instructions that further enable the processing device to delete the selected set of data access groups omitted from the subset of data access groups. The NE, for example, may include one of a server, a router, a transmitter, a receiver, an amplifier, a multiplexer, and a demultiplexer. The selected set of data access groups in some cases may be defined in an inclusion filter that includes only the data access groups to be edited with the new configuration data. The plurality of data access groups may be arranged in a hierarchical data tree having parent data access groups and child data access groups, whereby the processing device may be adapted to define the selected set of data access groups independent of parent/child relationships in the hierarchical data tree. The new configuration data may be received with an action request associated with one or more of NETCONF, RESTCONF, gRPC, gNMI, and YANG. Of course, other types of management protocols are also contemplated herewith. Also, the instructions may further enable the processing device to define the selected set of data access groups by targeting data access groups based on a user-defined scope.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for simplifying the processes to be initiated by a network operator, network manager, or other user who may perform management or administrative operations for controlling a communications network. More particularly, the embodiments of the present disclosure are focused on simplifying the task of changing configuration data for one or more Network Elements (NE) of a network. In conventional systems, a network operator would normally need to have knowledge of an entire configuration for safely making configuration changes without unintentionally impacting other portions of the configuration data. As opposed to replacing the entire configuration, the present disclosure allows a network operator to define which parts of the configuration are to be changed. Then, when these parts of the configuration are replaced, the embodiments of the present disclosure are adapted to prevent any changes (e.g., deletion) to other parts of the configuration.

Figure 1:
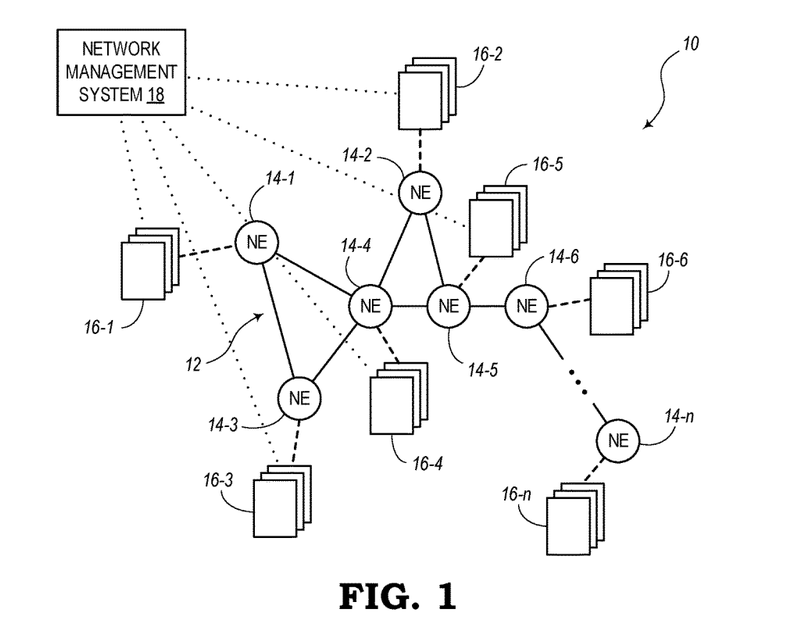
FIG. 1 is a diagram illustrating a network according to various embodiments of the present disclosure.

FIG. 1 is a diagram illustrating an embodiment of a network 10. In this embodiment, the network 10 includes an infrastructure 12 that enables a plurality of NEs 14-1, 14-2, . . . , 14-n to communicate with each other. For example, the NEs 14 may include any suitable physical component (e.g., switch, router, server, transmitter, receiver, amplifier, etc.) and/or any suitable virtual or software component (e.g., cloud application, Software-as-a-Service (SaaS), etc.). Each NE 14 is associated with configuration data 16-1, 16-2, . . . , 16-n, respectively, where the configuration data 16 may be stored in a local database or datastore or alternatively may be stored in a remote database or datastore. Also, a Network Management System (NMS) 18 may be arranged in the network 10 for managing the configuration data 16 associated with each of the NEs 14. In some embodiments, the NMS 18 may be adapted to operate as a Network Configuration Manager (NCM).

The network 10 may be adapted to support declarative configuration requests. In other words, a network operator (e.g., using the NMS 18) may provide a declaration of a desired state of the network 10 or a desired state of one or more NEs 14. The NMS 18, upon receiving this declaration, may be adapted to automatically determine how the configuration data 16 can be changed or edited as needed to provide the desired state.

For example, the NMS 18 may include mechanisms to receive an entire configuration in a single operation and then detect differences between a current configuration and a target end-state. As suggested above, conventional systems normally require a full-device configuration to be specified, or, in some cases, may require a complete subtree thereof to be replaced with the new target. The problem with the conventional systems, however, is that any configuration data that is not explicitly specified in the operation would be implicitly deleted (or returned to system default values). The NMS 18, according to various embodiments of the present disclosure, is adapted to limit the scope of configuration changes to just the portions of the configuration that the network operator wishes to change and leaves the other portions unchanged.

In many cases, the information included in the configuration data 16 of each of the plurality of NEs 14 may go beyond what a network operator may normally know or what the network operator has visibility of. A configuration change request may normally require too much knowledge of the current state. As a result, a network operator, using conventional systems, may simply avoid attempting to replace or remove things that are not of interest. However, with the present embodiments, the network operator may wish to operate on a subset of the configuration data without impacting other coincident peer configuration data under the same data tree. This may include data that is unknown or unavailable. With the present embodiments, the network operator can safely make partial changes without any concerns with respect to other portions outside the realm of interest or knowledge. Thus, knowledge of full configuration data 16 is not needed, only knowledge of the portion of the configuration data 16 that the network operator wishes to change.

The NMS 18 allows the network operator to limit the scope of these declarative operations more precisely to avoid unwanted side effects. In other words, the NMS 18 may include mechanisms for declarative configuration on a selective or filtered subset of configuration data 16 of one or more NEs 14. In particular, the present disclosure introduces the concept of a user-defined scope for a configuration change/edit operation. Normally, the entire configuration datastore is the target for declarative operations, such that any portions of the configuration that are missing, out-of-date, or outside of access control operations will be deleted, incorrectly edited, or otherwise result in a failure. By providing the network operator with the ability to limit the scope of the configuration change/edit operation to specific parts of the configuration data 16, the NMS 18 can allow more targeted operations to be performed.

Figure 2:
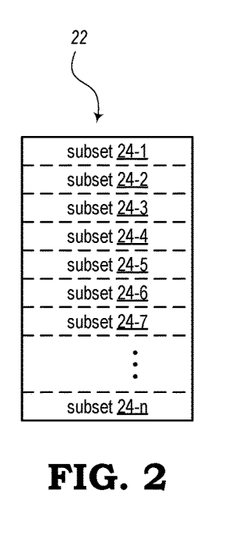
FIG. 2 is a diagram illustrating a simple data structure of configuration data associated with one or more of the Network Elements (NEs) shown in FIG. 1, according to various embodiments.

FIG. 2 is a diagram illustrating a simple data structure of configuration data 16 associated with one of the NEs 14 shown in FIG. 1. In this embodiment, the configuration data 16 may be divided into a number of subsets. Normally, editing the configuration data 16 includes replacement the whole configuration. In some embodiments, one or more complete subsets may be replaced.

Again, when configuration changes are made in the conventional systems, any configuration data not explicitly specified is implicitly deleted. In other conventional systems, changing parent (or higher level) subsets may inadvertently impact one or more child subsets. However, the NMS 18 of the present disclosure may be adapted to specifically target only the subsets (or data access groups) of the configuration data 16 that are intended to be edited (e.g., added, deleted, changed, etc.). Thus, the NMS 18 can edit the subsets of the configuration data 16 as needed.

Figure 3:
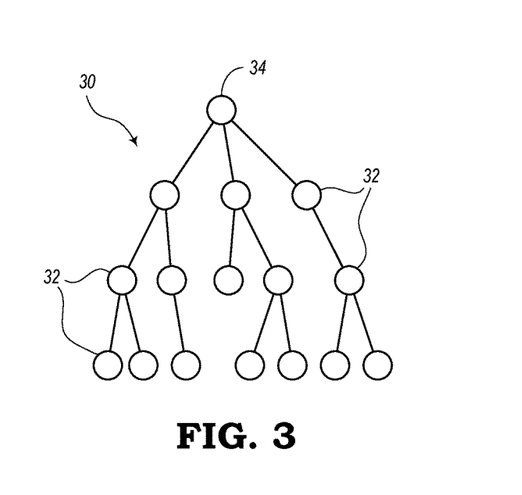
FIG. 3 is a diagram illustrating another data structure of configuration data associated with one or more of the NEs shown in FIG. 1, according to various embodiments.

FIG. 3 is a diagram illustrating another embodiment of a data structure 30 of configuration data 16 that may be associated with each of one or more NEs 14. In this embodiment, the data structure 30 is arranged as a data tree having a plurality of data access groups 32. The data access groups 32 may each include one or more attributes or settings that define the functional aspects of the NE 14 as included in the associated configuration data 16. The data tree of the data structure 30 includes a hierarchy with parent data access groups (or parent nodes) and child data access groups (or child nodes). The data structure 30 may also include a root data group 34.

It should be noted that the motivation of being able to limit the scope of the replace operation without having to provide a complete target description may be significant in a number of ways. For example, a "deletion by omission" operation (e.g., as is common with conventional systems) makes unintended side-effects very likely. Also, the present disclosure allows a "minimum required configuration" concept, because creating a complete and accurate full description for every configuration operation can be difficult and typically requires a well-designed and thoroughly tested automation. The NMS 18 provides configuration editing operations that allow for more targeted replace operations.

With gRPC and gNMI, there is normally no way for the network operator to limit the scope of the path provided to a smaller subset to avoid disturbing elements not in the intent. Also, YANG does not explicitly define a way to allow the user to narrow the scope of a root-level operation to only those data models or sub-tree paths that are relevant to the user. In conventional solutions, NETCONF, RESTCONF, gRPC, gNMI, and YANG lack the ability to easily limit the scope of an operation to a known subset (or data access group 32) of interest. The embodiments of the present disclosure may be incorporated into NETCONF REST-CONF, gRPC, gNMI, and/or YANG or provided as a modification of these protocols to allow a target scope for modifying configuration data. As described in the present disclosure, the NMS 18 enables the network operator to apply changes to only a subset (or to only one or more data access groups 32) of a configuration without having to worry about the attributes or settings outside the scope of interest.

Figure 4:
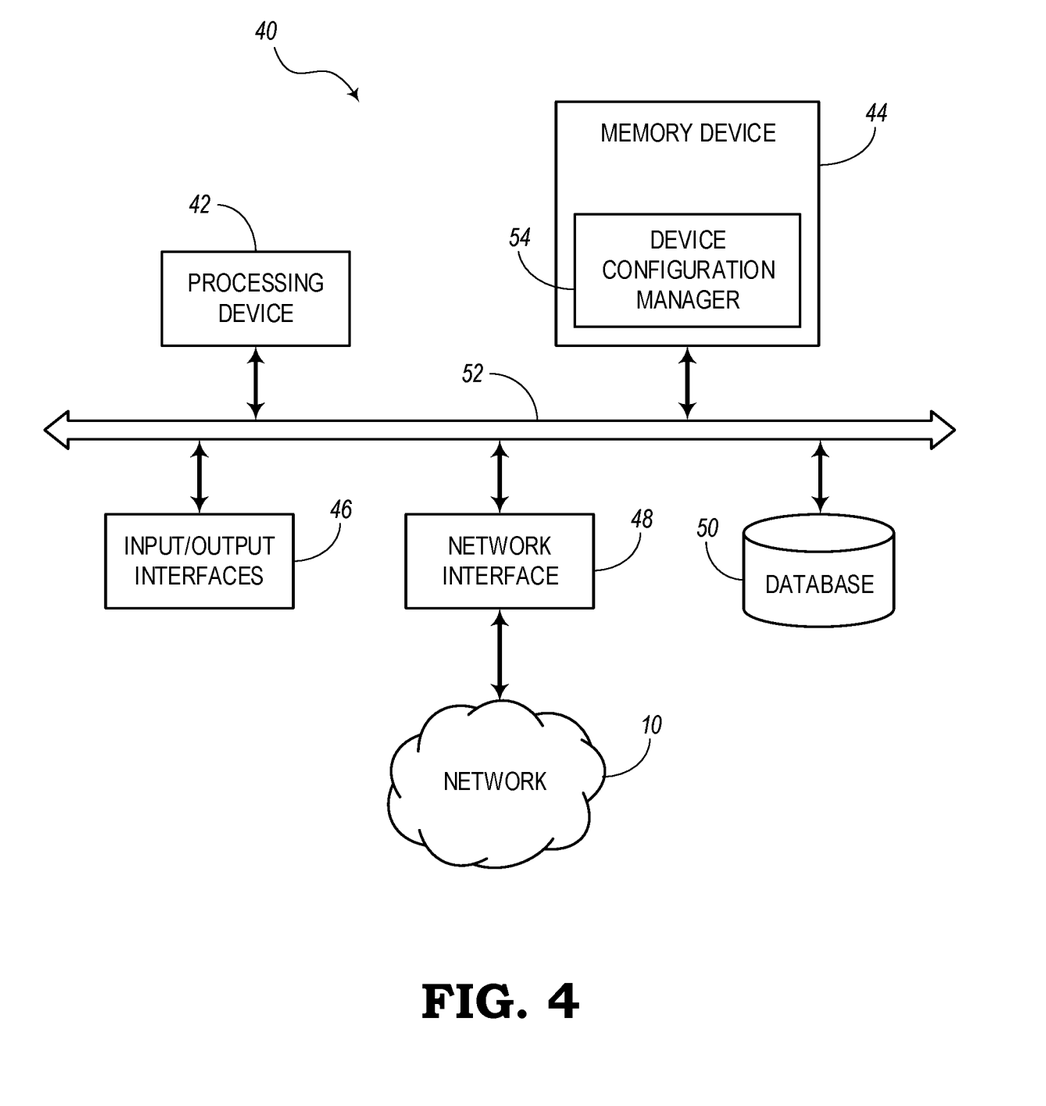
FIG. 4 is a block diagram illustrating a Network Management System (NMS) for editing configuration data associated with one or more of the NEs shown in FIG. 1, according to various embodiments of the present disclosure.

FIG. 4 is a block diagram illustrating an embodiment of a Network Management System (NMS) 40 (e.g., NMS 18 shown in FIG. 1) for editing configuration data (e.g., configuration data 16) associated with one or more NEs (e.g., NEs 14) in a network (e.g., network 10). The NMS 40, for example, may be a computer system, a server, a Software Defined Networking (SDN) controller, or other suitable control device, and may be implemented in a control plane of a network system (e.g., network 10).

In the illustrated embodiment, the NMS 40 may be a digital computer that, in terms of hardware architecture, generally includes a processing device 42, a memory device 44, Input/Output (I/O) interfaces 46, a network interface 48, and a database 50. The memory device 44 may include a datastore, database (e.g., database 50), or the like. It should be appreciated by those of ordinary skill in the art that FIG. 4 depicts the NMS 40 in a simplified manner, where practical embodiments may include additional components and suitably adapted processing logic to support known or conventional operating features that are not described in detail herein. The components (i.e., 42, 44, 46, 48, 50) are communicatively coupled via a local interface 52. The local interface 52 may be, for example, but not limited to, one or more buses or other wired or wireless connections. The local interface 52 may have additional elements, which are omitted for simplicity, such as controllers, buffers, caches, drivers, repeaters, receivers, among other elements, to enable communications. Further, the local interface 52 may include address, control, and/or data connections to enable appropriate communications among the components 42, 44, 46, 48, 50.

The processing device 42 is a hardware device adapted for at least executing software instructions. The processing device 42 may be any custom made or commercially available processor, a Central Processing Unit (CPU), an auxiliary processor among several processors associated with the NMS 40, a semiconductor-based microprocessor (in the form of a microchip or chip set), or generally any device for executing software instructions. When the NMS 40 is in operation, the processing device 42 may be adapted to execute software stored within the memory device 44, to communicate data to and from the memory device 44, and to generally control operations of the NMS 40 pursuant to the software instructions.

It will be appreciated that some embodiments of the processing device 42 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 42 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 46 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 46 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 48 may be used to enable the NMS 40 to communicate over a network, such as the network 10, the Internet, a Wide Area Network (WAN), a Local Area Network (LAN), and the like. The network interface 48 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 48 may include address, control, and/or data connections to enable appropriate communications on the network 10.

The memory device 44 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 44 may incorporate electronic, magnetic, optical, and/or other types of storage media. The memory device 44 may have a distributed architecture, where various components are situated remotely from one another, but can be accessed by the processing device 42. The software in memory device 44 may include one or more software programs, each of which may include an ordered listing of executable instructions for implementing logical functions. The software in the memory device 44 may also include a suitable Operating System (O/S) and one or more computer programs. The O/S essentially controls the execution of other computer programs, and provides scheduling, input-output control, file and data management, memory management, and communication control and related services. The computer programs may be adapted to implement the various processes, algorithms, methods, techniques, etc. described herein.

The memory device 44 may include a datastore used to store data. In one example, the datastore may be located internal to the NMS 40 and may include, for example, an internal hard drive connected to the local interface 52 in the NMS 40. Additionally, in another embodiment, the datastore may be located external to the NMS 40 and may include, for example, an external hard drive connected to the Input/Output (I/O) interfaces 46 (e.g., SCSI or USB connection). In a further embodiment, the datastore may be connected to the NMS 40 through a network (e.g., network 10) and may include, for example, a network attached file server.

Moreover, some embodiments may include a non-transitory computer-readable storage medium having computer readable code stored in the memory device 44 for programming the NMS 40 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 42 that, in response to such execution, cause the processing device 42 to perform a set of operations, steps, methods, processes, algorithms, functions, techniques, etc. as described herein for the various embodiments.

The NMS 40 may include a device configuration manager 54, which may be arranged in hardware, software, firmware, or any combination thereof. As shown, the device configuration manager 54 is stored in the memory device 44 and may be implemented as a computer program adapted to enable the processing device 42 to perform various functions, particularly for editing, changing, or modifying parts or all of the configuration data 16 that defines functional aspects of one or more NEs 14.

The NMS 40 may be adapted to manage network configuration data for one or more NEs or nodes in a network. For example, when a network (e.g., network 10) needs repair, modification, expansion or upgrading, the network operators (e.g., administrators, users, or other managers) can refer to the network configuration management database (e.g., database 50) to determine the best course of action. The configuration data may include the locations, IP addresses, network addresses, etc. of all hardware devices (e.g., NEs 14), as well as information about the default settings, attributes, programs, versions, updates, etc. installed in the NEs.

In some embodiments, the NMS 40 may be implemented as a network configuration management system. The NMS 40 may be adapted to replace data adapted to define functions of each of the NEs 14, particularly in the event of a failure. Different NEs 14 may save different configurations in different formats. Normally, finding this configuration information can be difficult when a particular device has to be replaced. The NMS 40 may be implemented as a centrally located server within the network 10, whereby configuration data can be stored in the database 50, according to some embodiments. In this arrangement, the configuration data for each device (e.g., NE 14) can be easily downloaded as needed.

The NMS 40 may include configuration tools can be used for relaunching an NE 14 after it fails. Also, the NMS 40 may include configuration management tools adapted to track configuration data on a daily basis to spot any changes in configurations, which could reveal cyber threats and potential failures and adapted for auditing and reporting to enable network operators to easily track information about network components.

According to some implementations, the NMS 40 may be adapted to enable "declarative configuration" actions. Declarative configuration management refers to the class of tools that allow network operators to declare a desired state of some system (e.g., one or more NEs 14, an Elastic Computing Cloud (EC2) Virtual Private Cloud (VPC) (or EC2 VPC), a cloud account, one or more physical machines, or other physical or virtual objects). With respect to declarative configuration management, the NMS 40 may automatically compare that desired state to the present state, and then automatically update the configurations of the managed system to match the declared state.

Figure 5:
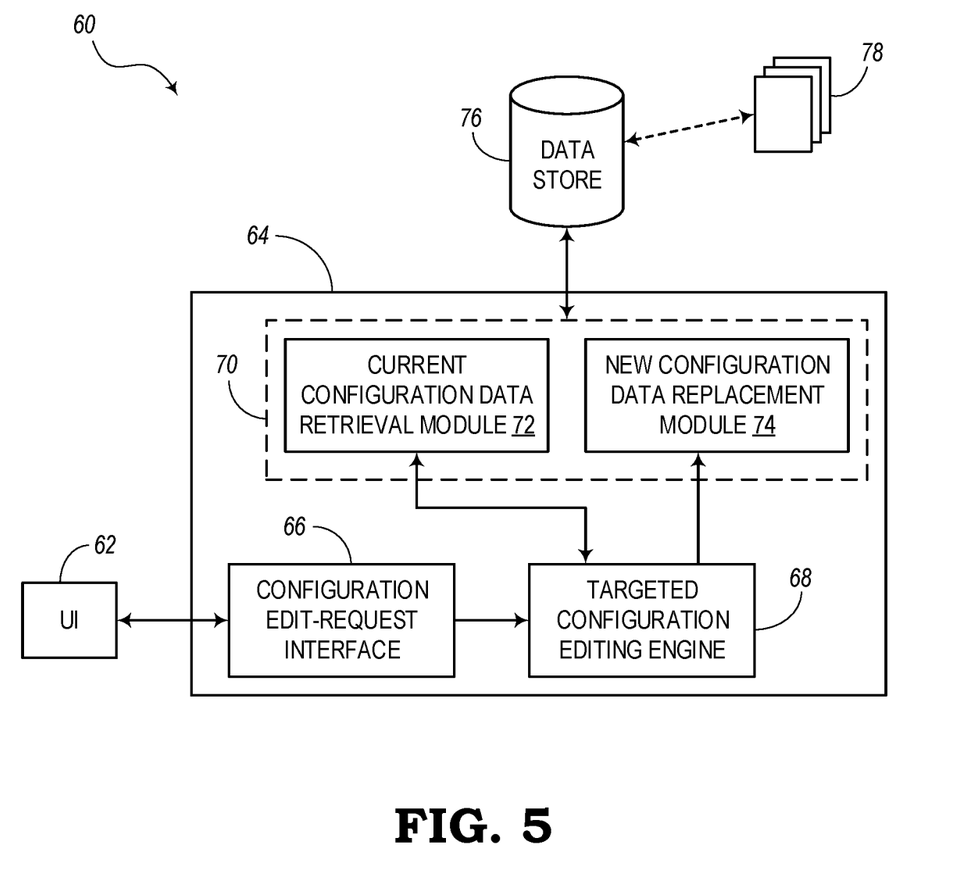
FIG. 5 is a block diagram illustrating a configuration editing system, according to various embodiments.

FIG. 5 is a block diagram illustrating an embodiment of a configuration editing system 60. In this embodiment, the configuration editing system 60 includes a User Interface (UI) 62 adapted to enable a user to enter requests for editing the configuration data of one or more Network Elements (NEs) in a network. Also, the UI 62 enables the user to provide new configuration data for replacing an existing configuration for a NE. Again, the configuration data is stored with respect to each individual NE and includes attributes, settings, or other suitable information for defining operational or functional aspects of the respective NE to allow the NE to operate within the network. The NE may be a server, switch, router, transmitter, receiver, amplifier, multiplexer, demultiplexer, or other type of physical device used in a network and/or an application, cloud application, Software-as-a-Service (SaaS), or other type of virtual component.

Furthermore, the configuration editing system 60 includes a configuration supervising device 64. In some embodiments, the configuration supervising device 64 may associated with the NMS 40 or device configuration manager 54 shown in FIG. 4. The configuration supervising device 64 is adapted to receive the configuration edit request and new configuration information from the UI 62.

In particular, the configuration supervising device 64, as shown in this embodiment, includes a configuration edit-request interface 66, a targeted configuration editing engine 68, and a datastore interface 70. The datastore interface 70 includes a current configuration data retrieval module 72 and a new configuration data replacement module 74. The datastore interface 70 of the configuration supervising device 64 is arranged in communication with a datastore device 76 (e.g., database 50) adapted to store one or more configurations 78 for one or more NEs.

In operation, the configuration edit-request interface 66 is arranged in communication with the UI 62 to receive requests to edit the configuration data for one or more NEs. The configuration edit-request interface 66 also receives an indication of the particular NE (e.g., an amplifier) whose configuration data is to be edited. Also, according to various embodiments of the present disclosure, the configuration edit-request interface 66 is further adapted to receive an "inclusion filter" from the UI 62. The inclusion filter, as described herein, includes information that defines a selected set of data access groups from the plurality of data access groups (e.g., subsets 24, data access groups 32, etc.) in the configuration data (or other data structure) stored for the intended NE. This selected set of data access groups includes the portions of the configuration data (e.g., attributes, settings, etc.) that are intended to be edited in the current request. The configuration editing system 60 is adapted to allow only this selected set of data access groups to be edited while ensuring that the data access groups that are excluded from the inclusion filter are left alone (and not deleted or replaced, as is the case in conventional systems). Thus, the data access groups included in the inclusion filter may be new data to be added to the configuration, old data to be deleted, and/or new data to replace old data.

In addition to the inclusion filter, the configuration edit-request interface 66 is further adapted to receive a "replacement indication" that indicates the data access groups (from the selected set of data access groups defined by the inclusion filter) that are intended to be replaced. Also, the configuration edit-request interface 66 receives new configuration data that is intended to replace the existing configuration data. Therefore, the configuration supervising device 64 is adapted to replace the intended configuration data that the user wishes to replace and also delete the data access groups included in the inclusion filter but not included in the replacement indication. Again, attributes or settings in the data access groups that are not listed in the inclusion filter will remain unchanged.

The configuration edit-request interface 66 receives this input from the UI 62 and passes it on to the targeted configuration editing engine 68. Thus, the targeted configuration editing engine 68 is adapted to receive a) the configuration edit request, b) the device whose configuration data is to be edited, c) the inclusion filter, d) the replacement indication, and e) the new configuration data for the selected data access groups. Upon receiving this input, the targeted configuration editing engine 68 is adapted to instruct the current configuration data retrieval module 72 to retrieve the applicable configuration data 78 pertaining to the selected NE from the datastore 76.

At this point, the targeted configuration editing engine 68 is adapted to obtain the current state of the configuration data for the selected NE and make appropriated changes based on the information provided by the UI 62. Specifically, the targeted configuration editing engine 68 may replace the old configuration data (e.g., old attributes, settings, etc.) included in the data access groups defined in the replacement indication with the new configuration data (e.g., new attributes, settings, etc.) as well as delete the old configuration data included in the inclusion filter but not specified in the replacement indication. The old configuration data excluded from the inclusion filter are left alone and are neither deleted nor changed. Then the targeted configuration editing engine 68 sends the edit configuration to the new configuration data replacement module 74, which stores the newly modified configuration data in the datastore 76.

When the configuration edit request is received by the configuration supervising device 64, the configuration supervising device 64 is adapted to store the modified configuration data 78 in the datastore 76. The new configuration data replacement module 74 may further be adapted to push this newly modified configuration data to the respective NE. For example, this function of pushing the new configuration based on a configuration request may use NETCONF, RESTCONF, gRPC, gNMI, YANG, or other protocols or Application Programming Interfaces (APIs). In particular, the configuration request (and other input) from the UI 62 may be a "declarative" request. The configuration supervising device 64 may be referred to as a class of tools adapted to provide configuration management allowing a user (e.g., network operator) associated with the UI 62 to declare a desired state of some system or device (e.g., NE). In response, the configuration supervising device 64 is adapted to automatically compare that desired state to the present state, and then automatically update the configuration data of one or more NEs to match the declared state. The declarative configuration may be compared to a macro where a new configuration is intended to replace (or edit) an existing configuration by adding, deleting, and replacing entries or data access groups of the configuration.

The configuration editing system 60 is adapted to process a declarative configuration plus an "inclusion filter" as described in the present disclosure. The benefit in this respect is that the network operator may wish to edit certain portions of a configuration but may not know everything that is included in the configuration. The conventional declarative configuration deletes entries that are not in the new configuration. However, the embodiments of the present disclosure add the inclusion filter to allow the user to identify explicitly what is being changed, whereby anything else is left as-is. Thus, the inclusion filter allows the user to identify only the portions that he or she is concerned with and does not require the user to be aware of the entire current state of the existing configuration. The inclusion filter allows the user to list what portions of the configuration to change, whereas, on the other hand, an exclusion filter (of conventional systems) requires the user to list things that are to be left alone, which assumes that the user has full visibility of the entire configuration, which, of course, may be extremely difficult given that some packet switches may have as many as 100 k entries in a configuration.

In a sense, the inclusion filter may be viewed as a filter that limits the extent to which the APIs are replaced. The inclusion filter may be described as a) a user-defined configuration filter, b) a user-defined datastore filter, c) a user-defined data access group filter, etc.

A replace operation in REST or gRPC may provide a path to indicate the level from which the replace operation is to begin. In compliance with this concept, the present disclosure further describes embodiments in which the inclusion filter is added to this path, which may be used to indicate all the subsets (or dependent or child data access groups) under this path to which the replace operation is limited.

According to one example, assume that an amplifier in the network includes a configuration with attributes {a, b, c, d, e, f, g}. In conventional systems, when a user wishes to edit the configuration, the user would provide:
Action=replace (or edit)
Path=/optical-amplifiers/amplifier[name='amp']
Data={a, b, e}
In this case, the result would be the deletion of attributes {c, d, f, g} and the replacement of attributes {a, b, e}.

In contrast, the present disclosure describes systems and methods where the user would provide the following:
Action=replace (or edit)
Path=/optical-amplifiers/amplifier[name='amp']
Filter (inclusion filter)={a, b, c, e, f}
Data={a, b, e}
In this case according to the embodiments of the present disclosure, the configuration supervising module 64 is adapted to provide different results. For example, the result of the above request includes the replacement of {a, b, e}, but the delete function would be limited to only {c, f} since those were in the filter but omitted from the data. The identification of the data to be replaced (e.g., {a, b, e}) may be referred to as the "replacement indication." Attributes {d, g} (and other attributes that the user may be unaware of) would not be modified.

A copy operation in NETCONF normally refers to a complete datastore. An inclusion filter can be provided, according to the spirit and scope of the present disclosure, to a copy operation in NETCONF, which may be provided via a subtree or some other specification. The inclusion filter in this respect may be adapted to limit the scope of the "copy-config" function to only the listed attributes (e.g., data access groups) provided in the filter.

Similar to the example above, the NETCONF request may be implemented as follows:

```
<copy-config>
    <source>running</source>
    <target>candidate</target>
    <filter>
        <optical-amplifiers >
            <amplifier>
                <a/><b/><c/><e/><f>
            </amplifier>
        </optical-amplifiers >
    </filter>
```

An edit operation in NETCONF may be provided via Extensible Markup Language (XML) metadata that indicates the elements to be replaced. If provided at a parent level, a filter can be provided under this replace operation that specifically a) excludes child elements from the replace operation, b) uses a new "filtered" operation qualifier that indicates that the elements to be included in the replace operation will be explicitly provided in the descendent content of the configuration, and/or c) include an additional parallel filter in the edit-config to indicate the scope of the edit-config.

Figure 6:
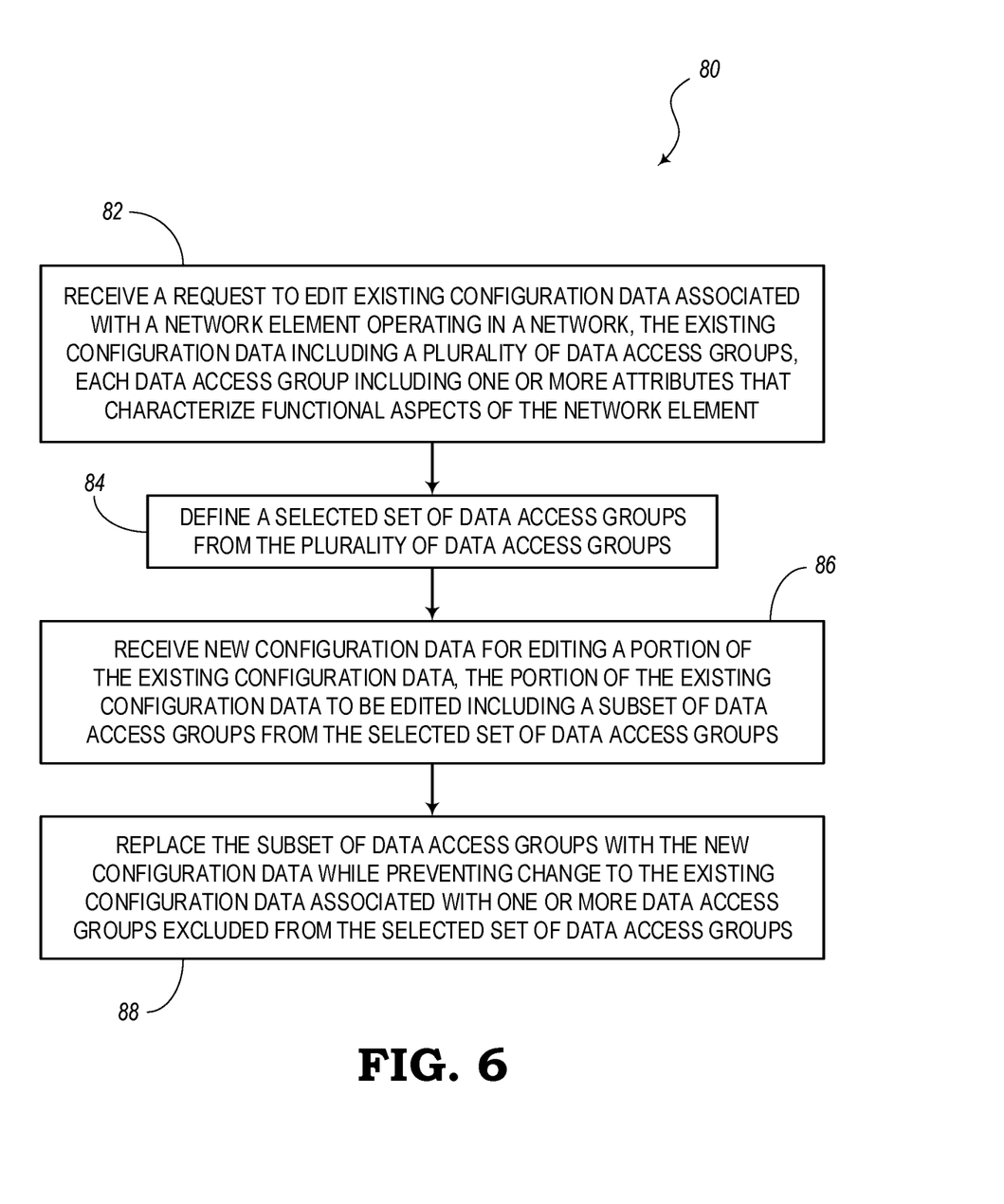
FIG. 6 is a flow diagram illustrating a process for supervising a configuration editing procedure in a network, according to various embodiments.

FIG. 6 is a flow diagram illustrating an embodiment of a process 80 for supervising a configuration editing procedure in a network. The process 80 includes a step of receiving a request to edit existing configuration data associated with a Network Element (NE) operating in a network, as indicated in block 82. The existing configuration data may include a plurality of data access groups, where each data access group includes one or more attributes that characterize functional aspects of the NE. The process 80 also includes the step of defining a selected set of data access groups from the plurality of data access groups, as indicated in block 84. New configuration data for editing a portion of the existing configuration data is received, as indicated in block 86. The portion of the existing configuration data to be edited includes a subset of data access groups from the selected set of data access groups. Also, the process 80 includes replacing the subset of data access groups with the new configuration data while preventing change to the existing configuration data associated with one or more data access groups excluded from the selected set of data access groups, as indicted in block 88.

According to additional embodiments, the process may further be defined whereby replacing the subset of data access groups (block 88) may include pushing the new configuration data to a datastore associated with the NE. The request described herein may be a declarative operation allowing a user to declare a desired state of the network, where the process 80 may further include the step of comparing the desired state of the network with a current state of the network defined by at least the existing configuration data associated with the NE. As a result of comparing the desired state with the current state, the process 80 may further include the step of defining the selected set of data access groups (block 84).

Furthermore, the process 80 may further include the step of deleting the selected set of data access groups omitted from the subset of data access groups. As an example, the NE described in the process 80 may include one of a server, a router, a transmitter, a receiver, an amplifier, a multiplexer, a demultiplexer, or another suitable device. Also, the selected set of data access groups may be defined in an inclusion filter that includes only the data access groups to be edited with the new configuration data. The data access groups described in the process 80 may be arranged in a hierarchical data tree having parent data access groups and child data access groups, where the process 80 may further include defining the selected set of data access groups independent of parent/child relationships in the hierarchical data tree. In addition, the process 80 may be defined whereby the new configuration data is received with an action request associated with one or more of NETCONF, RESTCONF, gRPC, gNMI, and YANG. The process 80 in some embodiments may also include defining the selected set of data access groups by targeting data access groups based on a user-defined scope.

In conventional systems, the entire configuration datastore is the target for declarative operations. Therefore, if anything is missing, out-of-date, or outside of access control operations, portions of the configuration may be deleted or incorrectly edited or may result in some other type of failure. One of the novel features of the present disclosure is the introduction of the concept of a user-defined scope for an operation associated with editing configuration data. This allows the user to limit the scope of the configuration editing operation to specific parts of the configuration data, which results in a more targeted replacement operation.

The motivation to limit the scope of the replace operation without having to provide a complete target description has many significant benefits as would be understood by one of ordinary skill in the art. The embodiments of the present disclosure overcome some of the issues with conventional systems, such as the conventional "deletion by omission" scheme that can have unintended negative side-effects. Also, by limiting the scope of replacement, as described in the present disclosure, the present systems and methods may provide a "minimum required configuration" scheme that avoids the difficulty of requiring the user to create a complete and accurate full description for every configuration operation. By pinpointing the portions of the configuration to be edited to provide targeted replacement, the present disclosure does not require a well-designed and thoroughly tested automation process.

From a software perspective, a control plane of an NMS may have a different software architecture than the network element software in the system, but they may both be controlled by the same messaging layer. It may not matter what software architecture is employed, as long as the system has an API that allows a device to establish itself as a trusted source for making configuration changes. Establishing trusted devices may be an action that is driven by the device layer. Otherwise, if a device that should be trusted (e.g., an NMS) requests a configuration change, if it is not recognized by other devices as a trusted source or does not respect that level of trust, then the declarative configuration change may not be performed.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A network management system comprising:
a processing device, and
a memory device adapted to store a computer program having instructions that, when executed, enable the processing device to
receive a request to edit existing configuration data associated with a Network Element (NE) operating in a network, the existing configuration data including a plurality of attributes that characterize functional aspects of the NE to configure for how the NE operates in the network, wherein the NE is a physical device that is one of a switch, router, transmitter, receiver, amplifier, multiplexer, and demultiplexer that operates in the network, wherein the NE has a configuration based on the existing configuration data and is managed by the network management system, wherein the network management system does not completely know all of the configuration of the NE, and wherein the request is a declarative operation allowing a user to declare a desired state of the NE in the network,
compare the desired state with a current state defined by at least the existing configuration data associated with the NE,
obtain a selected set of attributes from the plurality of attributes responsive to the received request from the user, to limit the scope of the declarative operation such that other attributes besides the selected set of attributes are not edited or deleted based on the declarative operation, wherein the selected set of attributes is defined by the user in an inclusion filter that includes only the attributes to be edited with the new configuration data, wherein the inclusion filter is one of a schema filter, a datastore filter, and an access group filter,
obtain new configuration data for editing a portion of the existing configuration data, the portion of the existing configuration data to be edited including the selected set of attributes, and replace a subset of the selected set of attributes included in existing configuration data with the new configuration data while preventing change to attributes included in the existing configuration data associated with one or more attributes excluded from the selected set of attributes.

2. The network management system of claim 1, wherein replacing the subset of the attributes includes pushing the new configuration data based on a configuration request to a datastore associated with the NE.

3. The network management system of claim 1, wherein, as a result of comparing the desired state with the current state, the processing device is adapted to define the selected set of attributes.

4. The network management system of claim 1, wherein the instructions further enable the processing device to delete the selected set of attributes omitted from the subset of attributes or a selected set of data across groups omitted from a subset of data across groups.

5. The network management system of claim 1, wherein the NE includes one of a transmitter, a receiver, an amplifier, a multiplexer, and a demultiplexer.

6. The network management system of claim 1, wherein the
plurality of attributes is arranged in a hierarchical data tree having parent attributes and child data attributes, and wherein the processing device is adapted to define the selected set of attributes independent of parent/child relationships in the hierarchical data tree.

7. The network management system of claim 1, wherein the declarative operation is performed in new configuration data is received with an action request associated with one or more of NETCONF, RESTCONF, gRPC, gNMI, and YANG based on a modification therein.

8. The network management system of claim 1, wherein the instructions enable the processing device to define the selected set of attributes by targeting attributes based on a user-defined scope.

9. A non-transitory computer-readable medium adapted to store computer logic having instructions enabling a processing device to:
receive a request to edit existing configuration data associated with a Network Element (NE) operating in a network, the existing configuration data including a plurality of attributes that characterize functional aspects of the NE to configure for how the NE operates in the network, wherein the NE is a physical device that is one of a switch, router, transmitter, receiver, amplifier, multiplexer, and demultiplexer that operates in the network, wherein the NE has a configuration based on the existing configuration data and is managed by the network management system, wherein the network management system does not completely know all of the configuration of the NE, and wherein the request is a declarative operation allowing a user to declare a desired state of the NE in the network,
compare the desired state with a current state defined by at least the existing configuration data associated with the NE,
obtain a selected set of attributes from the plurality of attributes responsive to the received request from the user, to limit the scope of the declarative operation such that other attributes besides the selected set of attributes are not edited or deleted based on the declarative operation, wherein the selected set of attributes is defined by the user in an inclusion filter that includes only the attributes to be edited with the new configuration data, wherein the inclusion filter is one of a schema filter, a datastore filter, and an access group filter,
obtain new configuration data for editing a portion of the existing configuration data, the portion of the existing configuration data to be edited including the selected set of attributes, and
replace a subset of the selected set of attributes included in existing configuration data with the new configuration data while preventing change to attributes included in the existing configuration data associated with one or more attributes excluded from the selected set of attributes.

10. The non-transitory computer-readable medium of claim 9, wherein replacing the subset of attributes includes pushing the new configuration data to a datastore associated with the NE.

11. The non-transitory computer-readable medium of claim 9, wherein the instructions further enable the processing device to compare the desired state of the network with a current state of the network defined by at least the existing configuration data associated with the NE.

12. The non-transitory computer-readable medium of claim 11, wherein, as a result of comparing the desired state with the current state, the processing device is adapted to define the selected set of attributes.

13. The non-transitory computer-readable medium of claim 9, wherein the instructions further enable the processing device to delete the selected set of attributes omitted from the subset of attributes.

14. A method comprising the steps of:
receive a request to edit existing configuration data associated with a Network Element (NE) operating in a network, the existing configuration data including a plurality of attributes that characterize functional aspects of the NE to configure for how the NE operates in the network, wherein the NE is a physical device that is one of a switch, router, transmitter, receiver, amplifier, multiplexer, and demultiplexer that operates in the network, wherein the NE has a configuration based on the existing configuration data and is managed by the network management system, wherein the network management system does not completely know all of the configuration of the NE, and wherein the request is a declarative operation allowing a user to declare a desired state of the NE in the network,
compare the desired state with a current state defined by at least the existing configuration data associated with the NE,
obtain a selected set of attributes from the plurality of attributes responsive to the received request from the user, to limit the scope of the declarative operation such that other attributes besides the selected set of attributes are not edited or deleted based on the declarative operation, wherein the selected set of attributes is defined by the user in an inclusion filter that includes only the attributes to be edited with the new configuration data, wherein the inclus ion filter is one of a schema filter, a datastore filter, and an access group filter,
obtain new configuration data for editing a portion of the existing configuration data, the portion of the existing configuration data to be edited including the selected set of attributes, and
replace a subset of the sissies sei of attributes included in existing configuration data with the new configuration data while preventing change to attributes included in the existing configuration data associated with one or more attributes excluded from the selected set of attributes.

15. The method of claim 14, further comprising the step of deleting the selected set of attributes omitted from the subset of attributes.

16. The method of claim 14, wherein the plurality of attributes is arranged in a hierarchical data tree having parent attributes and child attributes, and wherein the step of defining the selected set of attributes is performed independent of parent/child relationships in the hierarchical data tree.

17. The method of claim 14, wherein the declarative operation is performed in new configuration data is received with an action request associated with one or more of NETCONF, RESTCONF, gRPC, gNMI, and YANG based on a modification therein, and wherein the step of defining the selected set of attributes includes targeting attributes based on a user-defined scope.

* * * * *